United States Patent
Matsuno et al.

(10) Patent No.: US 8,640,567 B2
(45) Date of Patent: Feb. 4, 2014

(54) STEERING COLUMN DEVICE

(75) Inventors: Mitsuyoshi Matsuno, Kosai (JP); Tadao Ito, Toyohashi (JP); Takeshi Miyagi, Hamamatsu (JP)

(73) Assignee: Fuji Kiko Co. Ltd., Kosai-Shi, Shizuoka-Ken (JP)

( * ) Notice: Subject to any disclaimer, the term of this patent is extended or adjusted under 35 U.S.C. 154(b) by 234 days.

(21) Appl. No.: 13/188,788

(22) Filed: Jul. 22, 2011

(65) Prior Publication Data

US 2012/0024103 A1    Feb. 2, 2012

(30) Foreign Application Priority Data

Jul. 27, 2010  (JP) ................................ P2010-167900

(51) Int. Cl.
*B62D 1/18*  (2006.01)
*B62D 1/16*  (2006.01)
*F16H 29/02*  (2006.01)

(52) U.S. Cl.
USPC ............. 74/493; 74/492; 74/89.23; 74/89.42; 280/775

(58) Field of Classification Search
USPC .................. 74/492–495, 89.23, 89.34, 89.37, 74/89.42; 280/775, 777
See application file for complete search history.

(56) References Cited

U.S. PATENT DOCUMENTS

| | | | | |
|---|---|---|---|---|
| 4,967,618 A | * | 11/1990 | Matsumoto et al. | ............ 74/493 |
| 5,285,696 A | * | 2/1994 | Taylor | ........... 74/551.1 |
| 6,119,541 A | * | 9/2000 | Robinson | ........ 74/441 |
| 6,698,301 B2 | * | 3/2004 | Blaurock et al. | ............ 74/89.42 |
| 6,955,371 B2 | * | 10/2005 | French | ........... 280/279 |
| 2007/0258789 A1 | * | 11/2007 | Bogue | ........... 411/240 |
| 2008/0047382 A1 | * | 2/2008 | Tomaru et al. | ........... 74/388 PS |
| 2009/0100956 A1 | * | 4/2009 | Warashina | ...... 74/493 |
| 2009/0120229 A1 | * | 5/2009 | Shibazaki et al. | ............ 74/492 |

FOREIGN PATENT DOCUMENTS

| | | |
|---|---|---|
| JP | 2008-051233 A | 3/2008 |
| WO | 2008/001721 A1 | 1/2008 |

* cited by examiner

*Primary Examiner* — David M Fenstermacher
*Assistant Examiner* — Emily Cheng
(74) *Attorney, Agent, or Firm* — Nath, Goldberg & Meyer; Jerald L. Meyer (57) ABSTRACT

A female screw member 6 supported by a movable side bracket 31 includes: a movable side casing 61 provided with a nut container 67 through which a male screw shaft member 54 passes; and a pair of nuts 62 and 63 inserted into the nut container 67 non-rotatably but movably in an axial direction of the male screw shaft member 54 while threadedly engaging with the male screw shaft member 54. The movable side casing 61 includes a wedge member 64 whose tip end 64c is inserted between the nuts 62 and 63. The nuts 62 and 63 are separated from each other when the wedge number 64 is inserted therebetween, and outside surfaces 62c and 63c of female screw portions 62b and 63b of the nuts 62 and 63 come into contact with and get held by a male screw portion 54a of the male screw shaft member 54, thereby eliminating backlash between the female screw portions 62b and 63b and the male screw portion 54a.

2 Claims, 9 Drawing Sheets

STEERING COLUMN DEVICE

TECHNICAL FIELD

The present invention relates to an electric steering column device configured to perform positioning of a steering shaft by driving an electric motor.

BACKGROUND ART

There is disclosed an electric steering column device of this type including a male screw shaft member rotatably supported by any one of a fixed side bracket and a movable side bracket, and a female screw member provided to the other one of the fixed side bracket and the movable side bracket and threadedly engaged with the male screw shaft member. The electric steering column device is configured to perform positioning of a steering shaft in a tilting direction and a telescopic direction by moving the fixed side bracket and the movable side bracket relative to each other in such a way that the female screw member is moved in an axial direction of the male screw shaft member with rotation of the male screw shaft member driven by an electric motor. However, the above-described electric steering column device needs to have a clearance (backlash) for sliding at a portion where the male screw shaft member and the female screw member threadedly engage with each other, and this clearance causes backlash of the steering shaft. Accordingly, there are proposed electric steering column devices which are capable of preventing a backlash between the male screw shaft member and the female screw member (see Patent Literature 1 and Patent Literature 2, for example).

Figure 1:
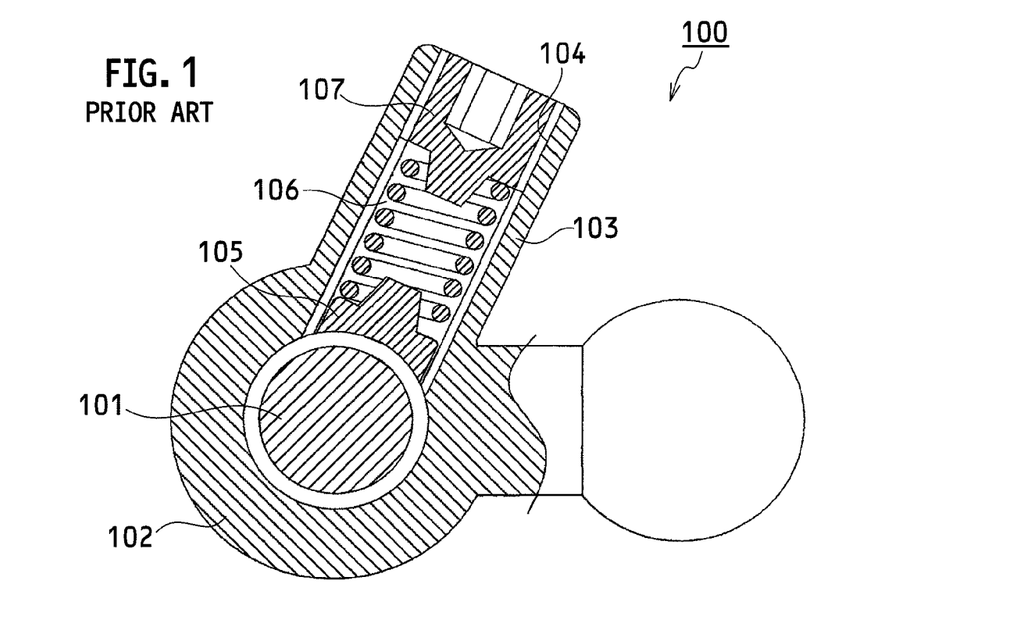
FIG. 1 is a cross-sectional view showing a first conventional example of a steering column device.

As shown in FIG. 1, a steering column device 100 described in Patent Literature 1 includes a male screw shaft member 101 and a female screw member 102, and the female screw member 102 and a boss 103 are integrally formed. The boss 103 includes a housing hole 104 where to house a pressing member 105 pressing an outer peripheral surface of the male screw shaft member 101 in a direction of an internal diameter of the female screw member 102, a coil spring 106 biasing the pressing member 105 toward the male screw shaft member 101, and an adjustment screw 107 screwed in the boss 103 to adjust a biasing force of the coil spring 106.

In the above-described configuration, the adjustment screw 107 housed in the housing hole 104 of the boss 103 is appropriately adjusted by screwed toward the pressing member 105 so as to allow the pressing member 105 to press the outer peripheral surface of the male screw shaft member 101 in the direction of the internal diameter of the female screw member 102 by using the biasing force of the coil spring 106. Hence it is possible to prevent a backlash between the male screw shaft member 101 and the female screw member 102 and thereby to reduce a backlash of the steering shaft after positioning.

Figure 2:
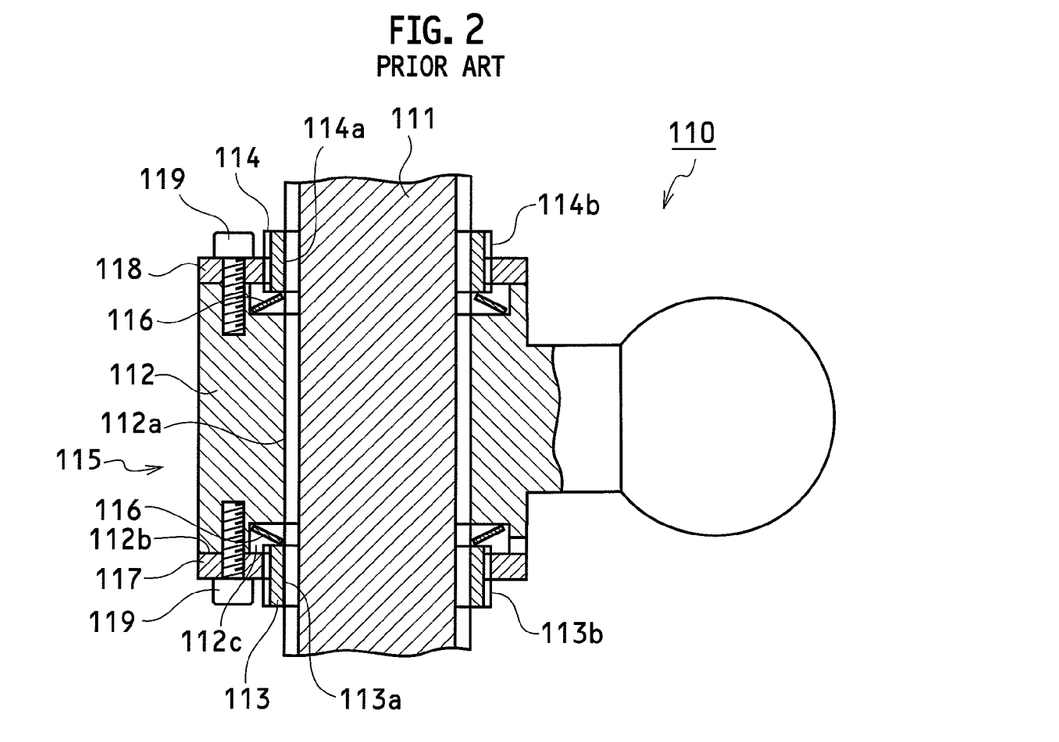
FIG. 2 is a cross-sectional view showing a second conventional example of a steering column device.
Figure 3:
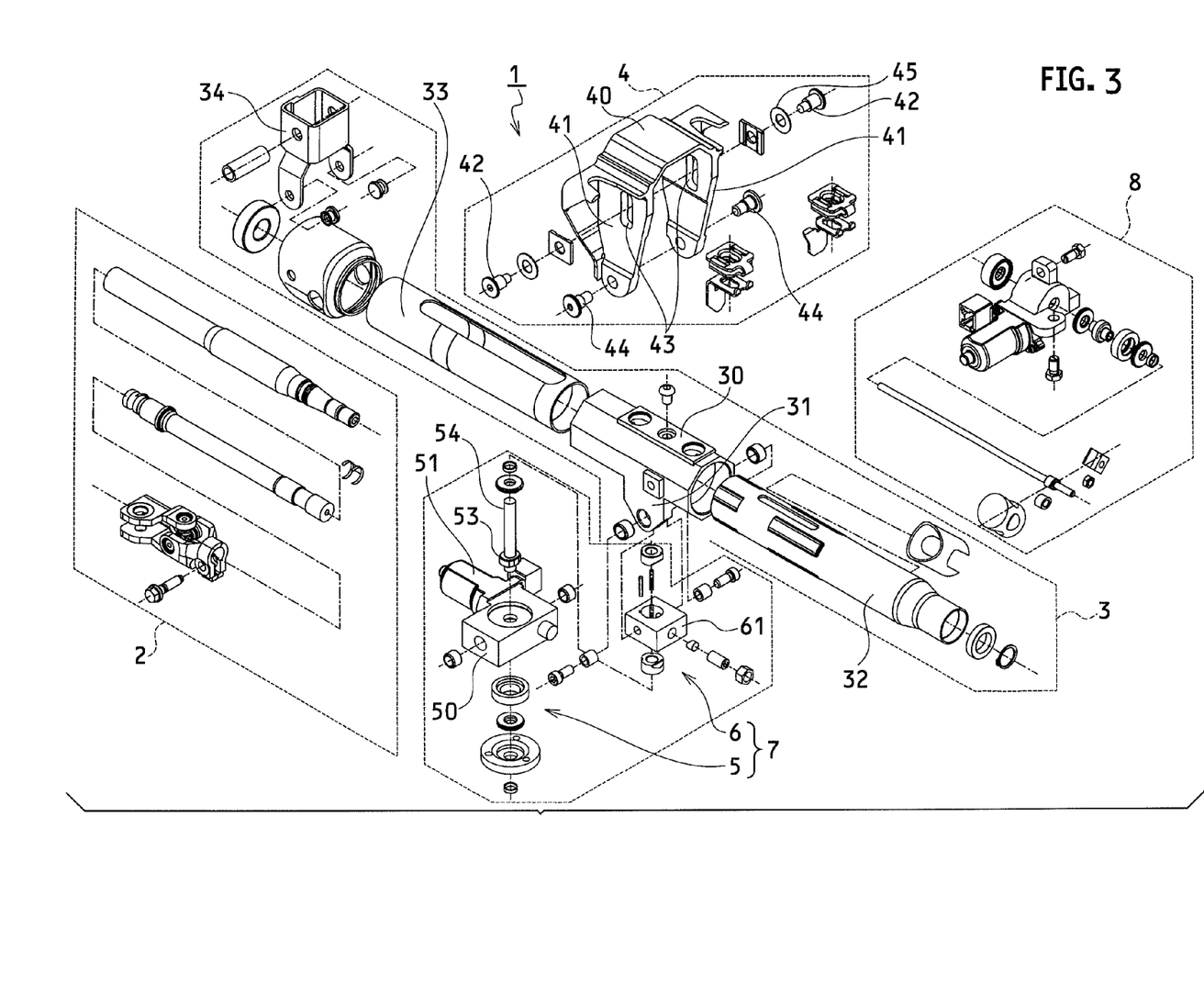
FIG. 3 is an exploded perspective view of a steering column device showing an embodiment of the present invention.
Figure 4:
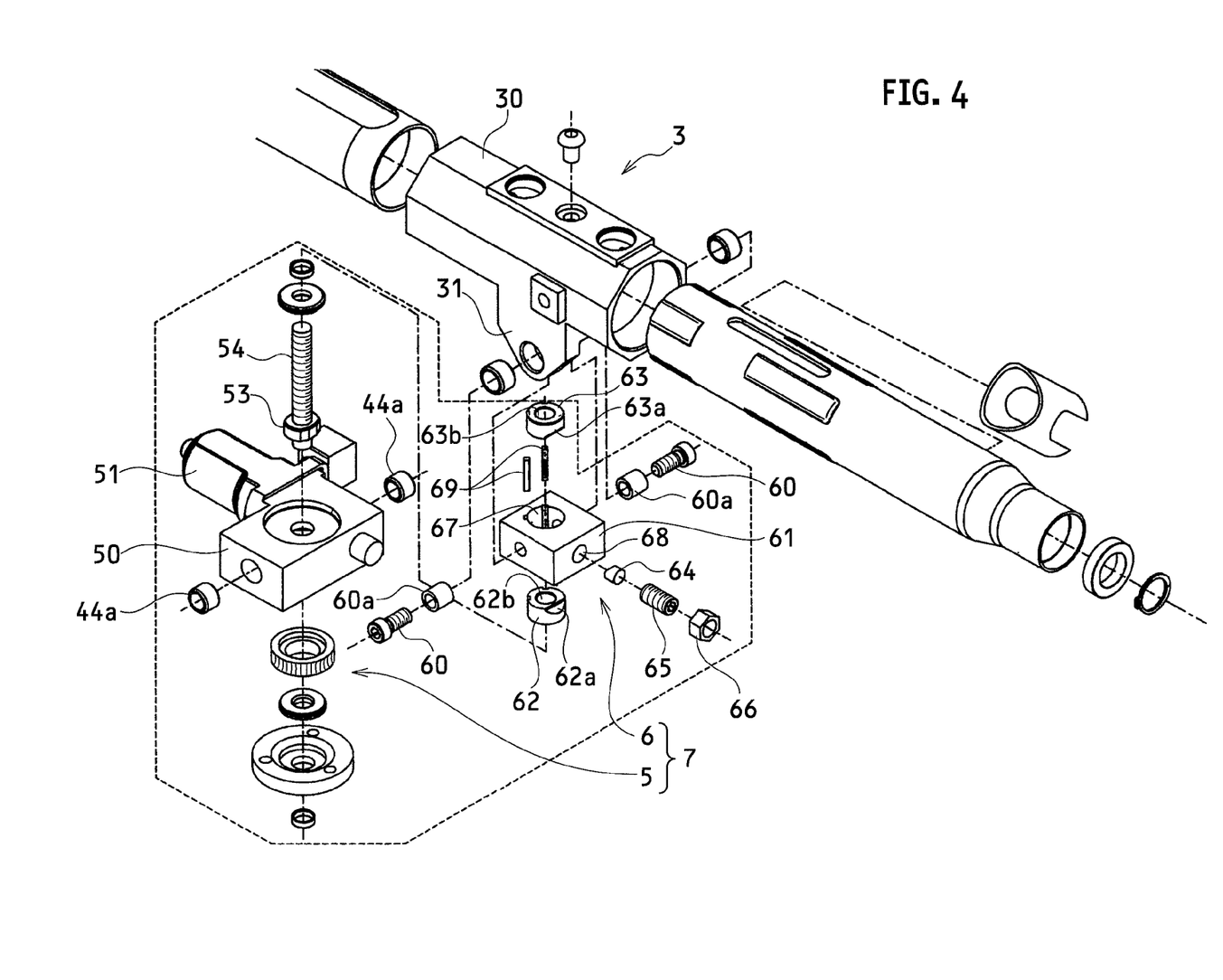
FIG. 4 is an enlarged exploded perspective view illustrating substantial part of the steering column device, showing the embodiment of the present invention.
Figure 5:
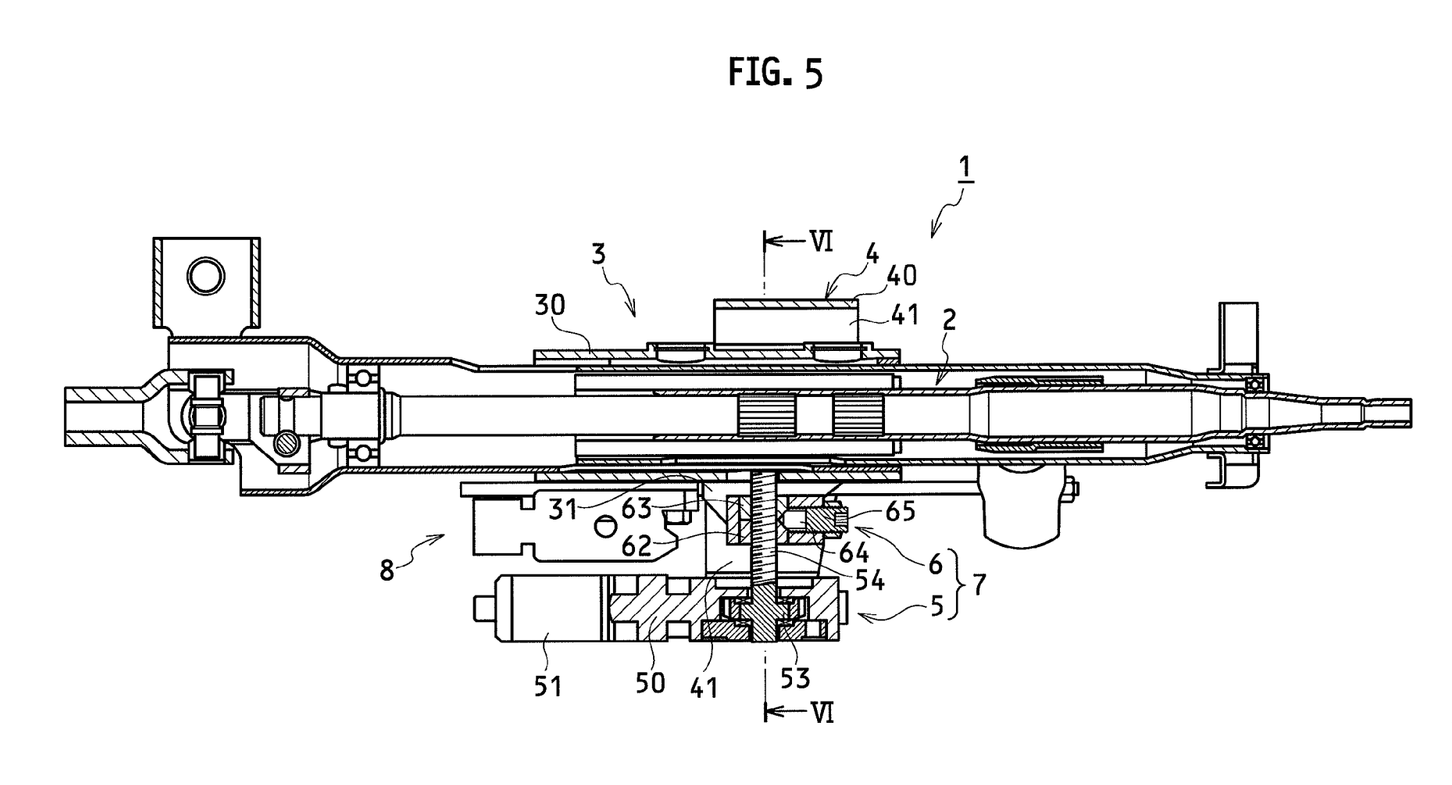
FIG. 5 is a cross-sectional view taken along an axial direction of the steering column device, showing the embodiment of the present invention.

As shown in FIG. 2, a steering column device 110 described in Patent Literature 2 includes a female screw member 115 provided with three nuts 112, 113, and 114 that are separated from each other in an axial direction of a male screw shaft member 111. The intermediate nut 112 is provided with a female screw portion 112a formed on an inner periphery thereof to be threadedly engaged with the male screw shaft member 111, and is provided with ring-shaped outer peripheral protruding portions 112b and recessed portions 112c respectively formed in both ends thereof in an axial direction of the male screw shaft member 111. The recessed portions 112c are located at inner side of the outer peripheral protruding portions 112b in the radial direction, and disc springs 116 are housed in the recessed portions 112c. Annular fixation rings 117 and 118 are respectively fastened on the outer peripheral protruding portions 112b by use of fastening bolts 119, and female serrations (not shown) extending in the axial direction of the male screw shaft member 111 are formed on inner peripheries of the respective fixation rings 117 and 118. Female screw portions 113a and 114a to be threadedly engaged with the male screw shaft member 111 are formed on inner peripheries of the end nuts 113 and 114, and male serrations 113b and 114b to be firmly fit to the respective female serrations are formed on outer peripheries of the end nuts 113 and 114. In this way, the end nuts 113 and 114 can move relative to the respective fixation rings 117 and 118 in the axial direction of the male screw shaft member 111.

In the above-described configuration, a backlash between the male screw shaft member 111 and the end nuts 113 and 114 is eliminated by expanding clearances between the intermediate nut 112 and the end nuts 113 and 114 by use of the disc springs 116, and thereby backlash of the steering shaft is reduced.

CITATION LIST

Patent Literatures

[Patent Literature 1] Japanese Patent Application Laid-Open No. 2008-51233
[Patent Literature 2] WO 2008/001721

SUMMARY OF INVENTION

Technical Problems

The technique described in Patent Literature 1 is to prevent the relative movement of the male screw shaft member 101 and the female screw member 102 by causing the pressing member 105 to press the outer peripheral surface of the male screw shaft member 101 in the direction of the internal diameter. Accordingly, this technique has a problem that when a force in the axial direction is applied to the male screw shaft member 101, the male screw shaft member 101 and the female screw member 102 slip on each other in the axial direction by an amount equivalent to a backlash therebetween. Moreover, this technique has a problem that since the pressing member 105 is biased at predetermined strength toward the male screw shaft member 101, the biasing force of the coil spring 106 needs to be set large to a certain extent; therefore, an increase in the rotational resistance of the male screw shaft member 101 leads to an increase in the drive noise of an electric motor for driving the male screw shaft member 101. Furthermore, this technique has a problem that if there is a gap between the housing hole 104 of the boss 103 and the pressing member 105, the pressing member 105 moves within the gap and causes noise when the male screw shaft member 101 is rotated.

The technique described in Patent Literature 2 has a problem that the three separate nuts 112 to 114, the fixation rings 117 and 118, the disc springs 116, and so forth are required and assembly performance is poor due to a large number of the components, and thereby the manufacturing cost increases.

In view of the aforementioned circumstances, an object of the present invention is to provide a steering column device capable of preventing a backlash of a steering shaft after positioning and simplifying a structure.

Solution to Problems

In a first aspect of the present invention, a steering column device includes: a male screw shaft member rotatably supported by any one of a fixed side bracket and a movable side bracket and provided with a male screw portion extending in an axial direction; and a female screw member provided on the other one of the fixed side bracket and the movable side bracket, wherein the movable side bracket is movable relative to the fixed side bracket in such a way that the female screw member is moved relative to the male screw shaft member by rotating the male screw shaft member, the female screw member includes: a casing having a nut container formed of a through hole; a pair of nuts inserted into the nut container so as to be movable in an axial direction of the nut container and not to be rotatable in a circumferential direction of the nut container, the nuts each having a female screw portion through which the male screw shaft member passes while threadedly engaging with the female screw portion; and a wedge member having a tip end in a tapered shape and being disposed on an inner side surface of the nut container with the tip end located between the pair of nuts, and the pair of nuts are separated from each other in the axial direction of the male screw shaft when the tip end of the wedge member is inserted between the pair of nuts, and outside surfaces of the female screw portions of the respective nuts come into contact with and thereby get held by the male screw portion of the male screw shaft member.

In a second aspect of the present invention, the steering column device of the first aspect further includes: an insertion hole formed of a screw hole passing through a side surface of the casing while extending orthogonally to the nut container; and a screw member inserted into the insertion hole, wherein the tip end of the wedge member is formed into such a wedge shape that two opposed surfaces of the tip end come closer to each other toward the tip, the pair of nuts respectively include inclined surfaces in a portion where their facing surfaces face the insertion hole, the inclined surfaces forming a wedge-shaped recessed portion configured to receive the tip end, the wedge member is disposed between the recessed portion and the screw member in the screw hole, and the wedge member is positioned by screwing the screw member into the insertion hole.

Advantageous Effects of Invention

According to the first aspect, the tip end of the wedge member to be supported by the casing of the female screw member is inserted from the side surface of the nut container into the space between the pair of nuts, and the pair of nuts are respectively pushed and moved to be separated from each other in the axial direction of the male screw shaft member by the wedge member. Hence it is possible to eliminate a backlash between the male screw shaft member and the pair of nuts and thereby to prevent a backlash of the steering shaft after positioning. Moreover, a load in the axial direction of the male screw shaft member acting on the pair of nuts of the female screw member is received by the wedge member whose tip end is inserted into the space between the pair of nuts, and is then transmitted to the casing. In this way, the structure can be simplified without separately providing a structure for fixing the pair of nuts of the female screw member to the casing. Hence it is possible to improve an assembly performance while reducing the number of components and to reduce the manufacturing cost.

According to the second aspect, the wedge member and the screw member are inserted into the insertion hole of the casing, and the wedge member is positioned with the screw member tightened as appropriate. In this way, an amount of separation between the pair of nuts in the axial direction is adjusted. Thus, the backlash between the male screw shaft member and the pair of nuts can be adjusted easily, and the male screw shaft member can be made easily rotatable relative to the pair of nuts by eliminating a biasing force to the pair of nuts. Hence it is possible to perform positioning of the steering shaft smoothly.

DESCRIPTION OF EMBODIMENT

An embodiment of the present invention will be described below with reference to the accompanying drawings. As shown in FIG. 3 to FIG. 13, a steering column device 1 of this embodiment includes: a steering shaft 2 configured to fix a steering wheel (not shown) to an upper end in an axial direction; a jacket unit 3 provided with an upper jacket 32, an intermediate jacket 30, and a lower jacket 33 rotatably supporting the steering shaft 2; a mount bracket 4 provided with a fixation unit 40 to be fixed to a car body (not shown) and a pair of suspended portions 41 suspending from the fixation unit 40; a tilting mechanism 7 provided with a driving member 5 and a female screw member 6 and configured to perform positioning of the jacket unit 3 in a tilting direction; and a telescopic mechanism 8 configured to perform positioning of the jacket unit 3 in a telescopic direction.

Figure 6:
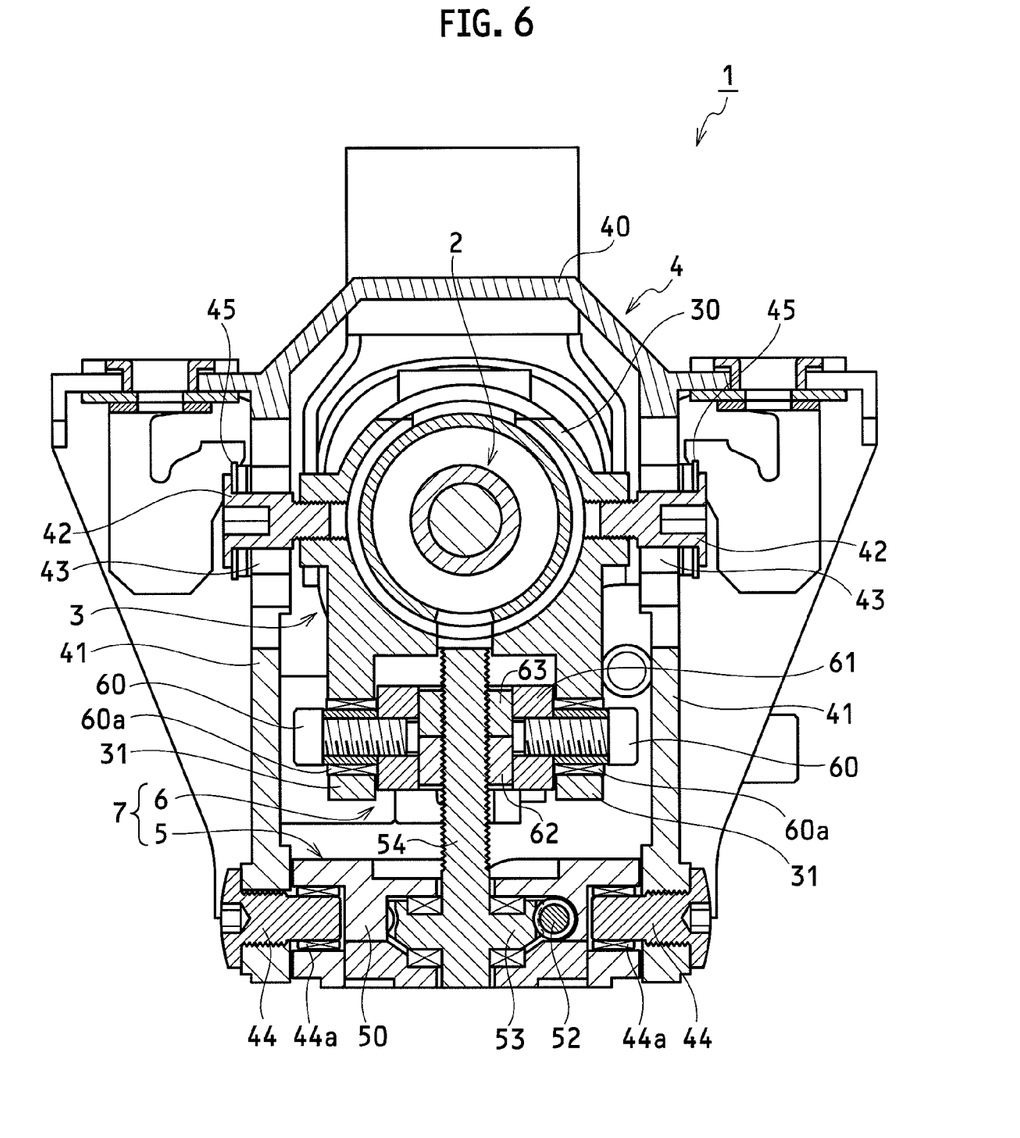
FIG. 6 is a cross-sectional view taken along a VI-VI line in FIG. 5, showing the embodiment of the present invention.
Figure 7:
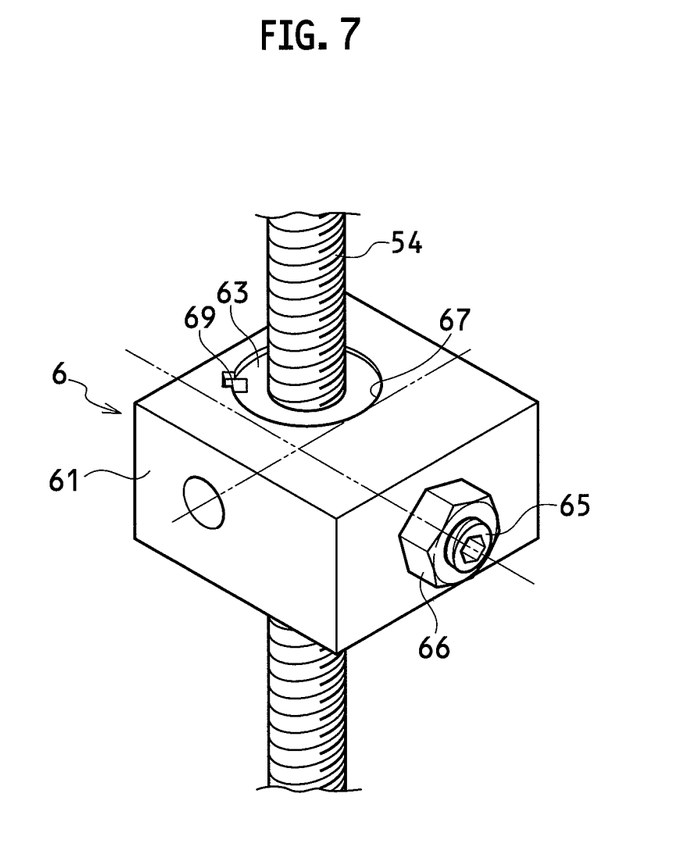
FIG. 7 is a perspective view illustrating a male screw shaft member and a female screw member, showing the embodiment of the present invention.
Figure 8:
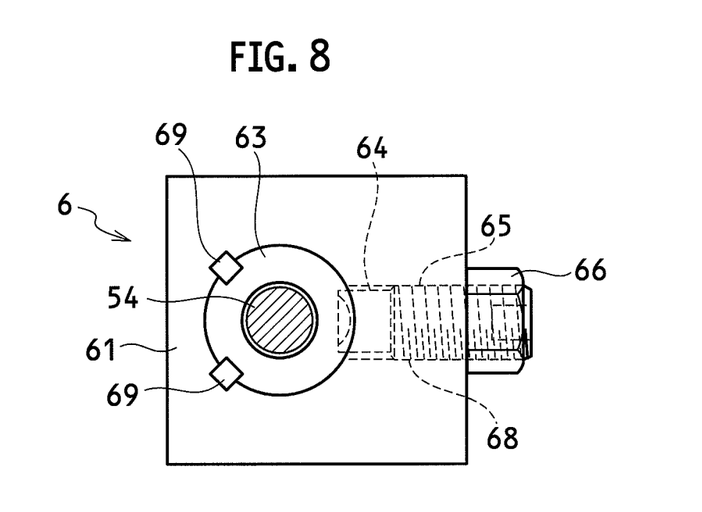
FIG. 8 is a plan view illustrating a male screw shaft member and a female screw member, showing the embodiment of the present invention.

The jacket unit 3 extends in an axial direction of the steering shaft 2. Meanwhile, a lower end in a longitudinal direction of the jacket unit 3 is supported by a car body (not shown) through a tilt bracket 34. In this way, the entire jacket unit 3 is rotatable in the tilting direction. The intermediate jacket 30 of the jacket unit 3 is located between the pair of suspended portions 41 and is provided with a pair of brackets 31 respectively extending downward. Moreover, a pair of bolts 42 as tilt guides to be respectively inserted into tilting long holes 43 provided in the pair of suspended portions 41 are attached to the intermediate jacket 30. Biasing members such as disk springs 45 are provided between the pair of bolts 42 and the brackets 31 of the intermediate jacket 30 so that the biasing members can prevent a backlash in a right-left direction of the steering shaft 2 as shown in FIG. 6.

The driving member 5 of the tilting mechanism 7 includes a fixed side casing 50, a worm shaft 52, a deceleration gear 53, and a male screw shaft member 54. The fixed side casing 50 is interposed between lower ends of the pair of suspended portions 41 and is rotatably supported in the tilting direction by a pair of rotating shafts 44 and needle bearings 44a. The worm shaft 52 is housed in the fixed side casing 50 and is driven by a tilting electric motor 51. The deceleration gear 53 is engaged with the worm shaft 52. The male screw shaft member 54 is integrally formed on the deceleration gear 53 so as to extend in an orthogonal direction to an axial direction of the pair of rotating shafts 44.

The female screw member 6 includes a movable side casing 61, a pair of nuts 62 and 63, a wedge member 64, a screw member 65, and a double nut 66.

The movable side casing 61 is interposed between the brackets 31 of the intermediate jacket 30 and is rotatably supported in the tilting direction by a pair of rotating shafts 60 and needle bearings 60a. Moreover, the movable side casing 61 is provided with a nut container 67 to be penetrated by the male screw shaft member 54, and an insertion hole 68 extending in an orthogonal direction to the nut container 67 and allowing insertion of the wedge member 64 and the screw member 65. A female screw portion 68a to be engaged with the screw member 65 is formed on an inner periphery of the insertion hole 68. The pair of nuts 62 and 63 are inserted into the nut container 67 movably in an axial direction of the male screw shaft member 54. The nut container 67 is also provided with rotation stopper keys 69 for the nuts 62 and 63.

Female screw portions 62b and 63b to be engaged with the male screw shaft member 54 are respectively formed on inner peripheries of the pair of nuts 62 and 63. Moreover, the pair of nuts 62 and 63 respectively include inclined surfaces 62a and 63a in a portion where their facing surfaces face the insertion hole 68 when the nuts 62 and 63 are contained in the nut container 67. These inclined surfaces 62a and 63a form a wedge-shaped recessed portion 64d configured to receive a tip end 64c of the wedge member 64.

Figure 9A:
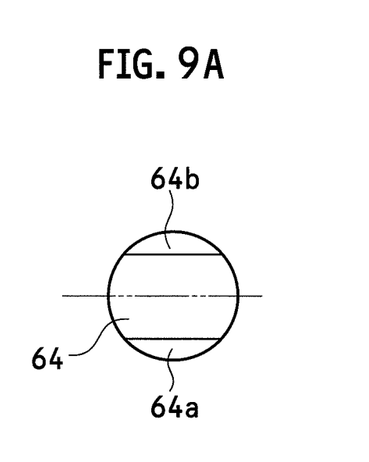
FIG. 9A is a front view of a wedge member and FIG. 9B is a side view of the wedge member, showing the embodiment of the present invention.
Figure 9B:
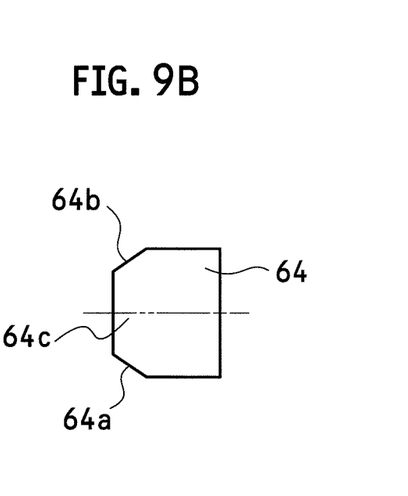

In the wedge member 64, a pair of tapered surfaces 64a and 64b, which are provided on the tip end 64c, form a wedge shape such that two surfaces opposed to the tip end 64c come close to each other toward a tip. Specifically, as shown in FIG. 9A and FIG. 9B, the tip end 64c of the wedge member 64 is formed substantially into a trapezoidal cross section. The wedge member 64 is disposed inside the insertion hole 68 such that the tip end 64c protrudes into the nut container 67, and is configured to, when the tip end 64c is inserted into the recessed portion 64d, broaden a clearance between the pair of nuts 62 and 63 while being in contact with the inclined surfaces 62a and 63a constituting the recessed portion 64d.

The screw member 65 is screwed into the insertion hole 68 and is tightened to perform positioning of the wedge member 64. At this time, the wedge member 64 is positioned such that any biasing forces from the tapered surfaces 64a and 64b of the wedge member 64 is not applied to the inclined surfaces 62a and 63a of the pair of nuts 62 and 63. Meanwhile, a tail end 65a of the screw member 65 protrudes from the insertion hole 68. The screw member 65 is fixed to the movable side casing 61 with the tail end 65a engaged with the double nut 66.

According to the above-described configuration, when the tilting electric motor 51 is rotated for positioning the steering shaft 2 in the tilting direction, the male screw shaft member 54 is rotated in a decelerated state by way of the worm shaft 52 and the deceleration gear 53, whereby the pair of nuts 62 and 63 of the female screw member 6 are driven in the axial direction of the male screw shaft member 54. In this way, the bracket (a movable side bracket) 31 of the intermediate jacket 30 moves relative to the mount bracket (a fixed side bracket) 4 and the respective bolts 42 of the intermediate jacket 30 move along the long holes 43 of the suspended portions 41. As a consequence, the jacket unit 3 is rotated in the tilting direction around a lower end in the longitudinal direction. Hence it is possible to perform positioning of the steering shaft 2 in the tilting direction.

Figure 10:
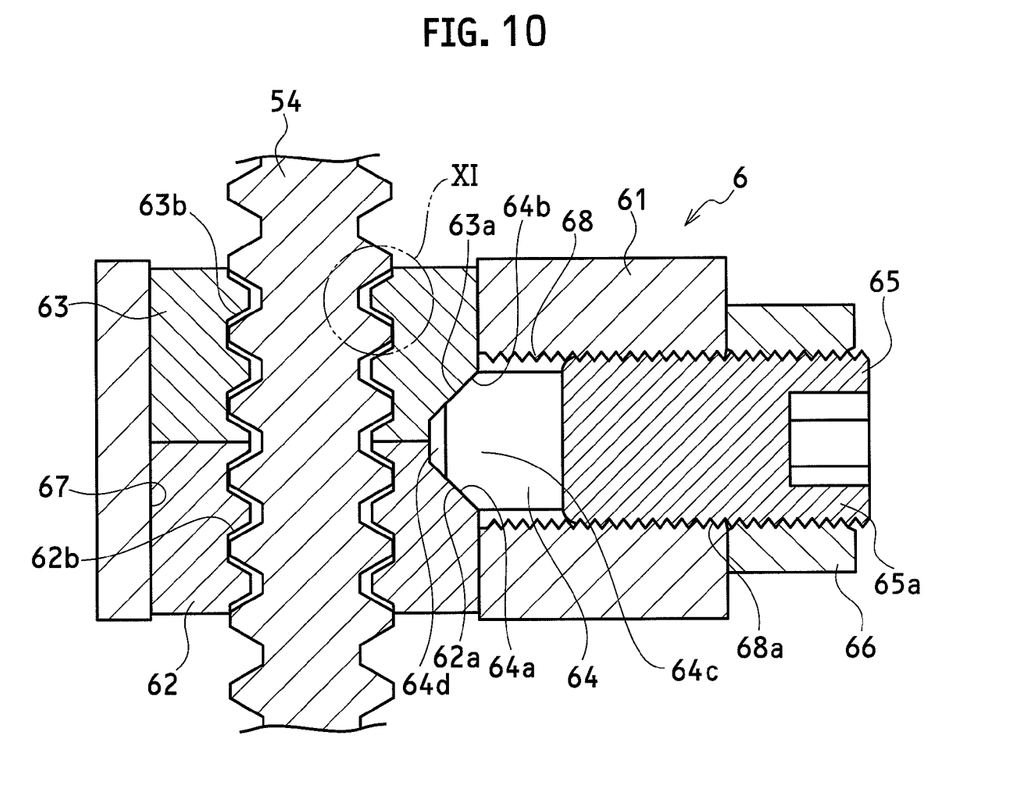
FIG. 10 is a cross-sectional view illustrating a state before activation of the wedge member, showing the embodiment of the present invention.
Figure 11:
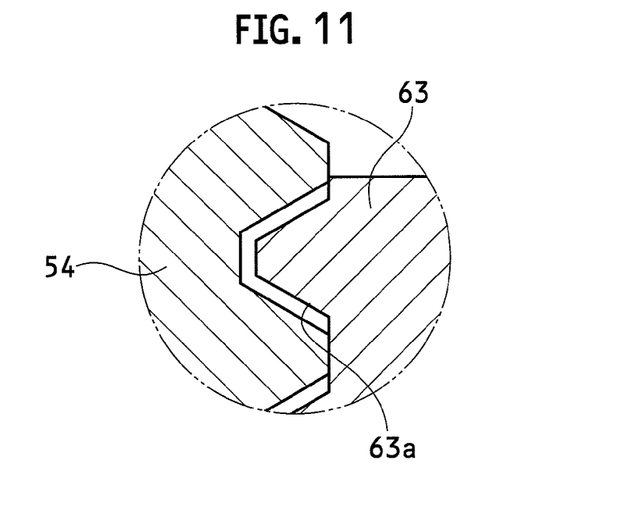
FIG. 11 is an enlarged cross-sectional view illustrating a XI part in FIG. 10, showing the embodiment of the present invention.

By the way, firstly in a state before tightening of the screw member 65 as shown in FIG. 10 and FIG. 11, the tip end 64c of the wedge member 64 is not engaged with the inclined surfaces 62a and 63a between the pair of nuts 62 and 63. Accordingly, the space between the pair of nuts 62 and 63 is narrow, whereby the clearance is formed between tooth surfaces of the female screw portions 62b and 63b on the inner peripheries of the nuts 62 and 63 and a tooth surface of the male screw shaft member 54. That is to say, a backlash occurs between the male screw shaft member 54 and the pair of nuts 62 and 63.

Figure 12:
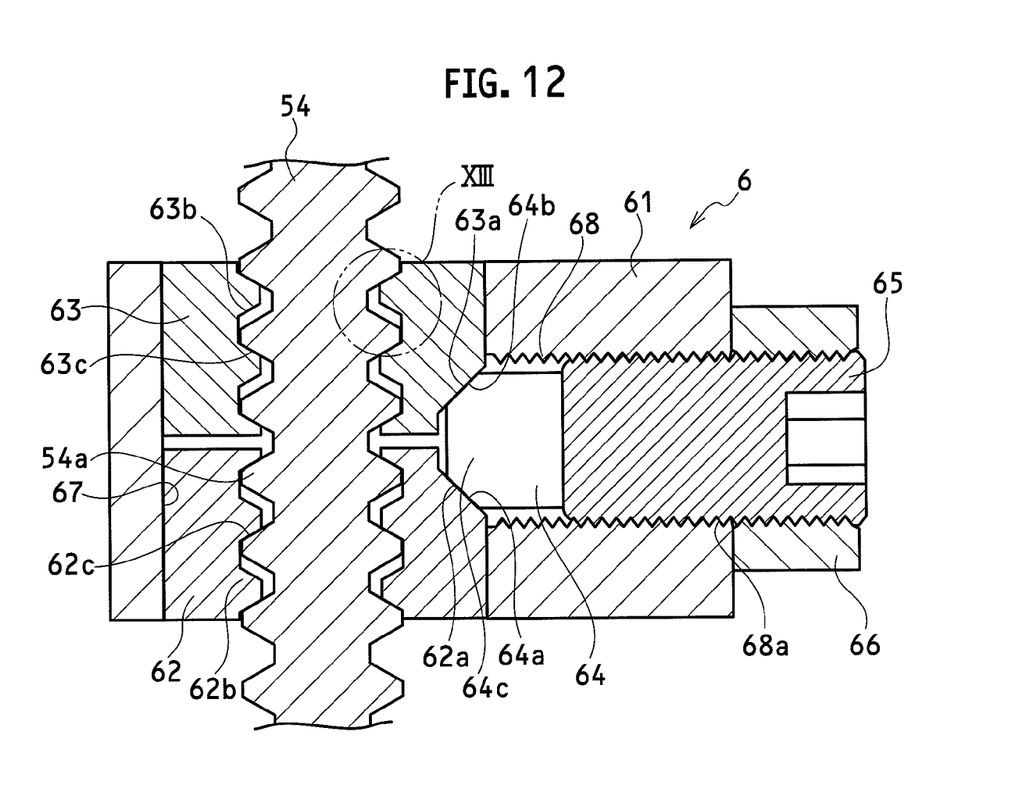
FIG. 12 is a cross-sectional view illustrating a state after activation of the wedge member, showing the embodiment of the present invention.
Figure 13:
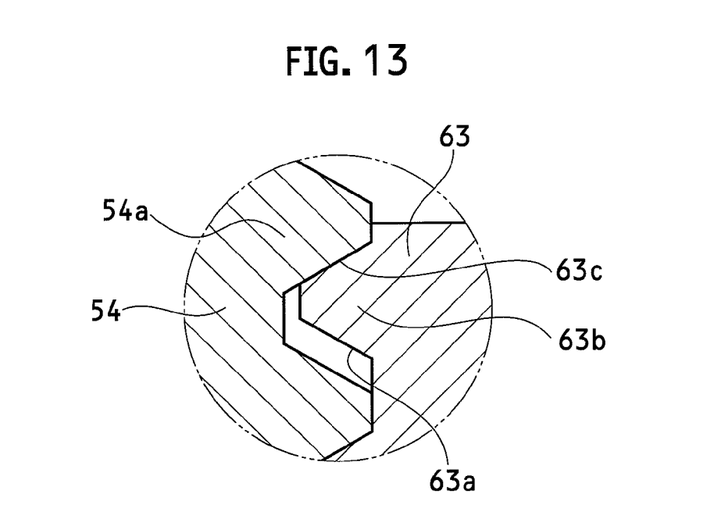
FIG. 13 is an enlarged cross-sectional view illustrating a XIII part in FIG. 12, showing the embodiment of the present invention.

Subsequently, as shown in FIG. 12 and FIG. 13, the wedge member 64 is pushed to the pair of nuts 62 and 63 by tightening the screw member 65 and a tightening amount of the screw member 65 is adjusted properly. Thereafter, the screw member 65 is fixed to the movable side casing by using the double nut 66.

By pushing the wedge member 64 toward the pair of nuts 62 and 63 by tightening the screw member 65 as described above, the tip end 64c of the wedge member 64 provided on the movable side casing 61 of the female screw member 6 is fitted in the space between the inclined surfaces 62a and 63a of the pair of nuts 62 and 63. Thus the pair of nuts 62 and 63 are pushed and moved to be separated from each other in the axial direction. As a consequence, the lower nut 62 moves downward along the male screw shaft member 54 while the upper nut 63 moves upward along the male screw shaft member. That is to say, outside surfaces 62c and 63c of the female screw portions 62b and 63b of the respective nuts 62 and 63 come into contact with and get held by a male screw portion 54a of the male screw shaft member 54. Hence the backlash between the male screw shaft member 54 and the pair of nuts 62 and 63 is eliminated.

According to this embodiment, the pair of nuts 62 and 63 are respectively pushed and moved to be separated from each other in the axial direction by the wedge member 64 provided on the movable side casing 61 of the female screw member 6 so that the backlash between the male screw shaft member 54 and the pair of nuts 62 and 63 can be eliminated. Hence it is possible to prevent a backlash in the tilting direction of the steering shaft 2 after positioning. Moreover, a load in the axial direction of the male screw shaft member 54 acting on the pair of nuts 62 and 63 of the female screw member 6 is received by the wedge member 64 whose tip end 64c is inserted between the pair of nuts 62 and 63, and is then transmitted to the movable side casing 61. Therefore, it is possible to simplify the structure without separately providing a structure for fixing the pair of nuts 62 and 63 to the movable side casing 61. Moreover, it is possible to improve an assembly performance while reducing the number of components and thereby to reduce the manufacturing cost.

Moreover, in this embodiment, the wedge member 64 and the screw member 65 are inserted into the insertion hole 68 of the movable side casing 61, and the screw member 65 engaged with the female screw portion 68a of the insertion hole 68 is tightened as appropriate. In this way, the wedge member 64 adjusts amounts of movement of the pair of nuts 62 and 63 in the axial direction of the male screw shaft member 54, so that the wedge member 64 does not apply any biasing force to the nuts 62 and 63. Thus, the backlash between the male screw shaft member 54 and the pair of nuts 62 and 63 can be adjusted easily, and the male screw shaft member 54 can be made easily rotatable relative to the pair of nuts 62 and 63 by reducing rotational resistance between the male screw shaft member 54 and the pair of nuts 62 and 63. Hence it is possible to perform positioning of the steering shaft in the tilting direction smoothly.

Furthermore, this embodiment does not employ a configuration to eliminate the backlash by biasing and holding the nuts onto the male screw shaft member using biasing means. Accordingly, it is possible to avoid an increase in the load applied to the driving means by the biasing force of the biasing means.

This embodiment has been illustrated as having the structure in which the nuts 62 and 63 of the female screw member 6 and the nut container 67 of the movable side casing 61 are formed in cylindrical shapes, and in which the rotation stopper keys 69 is fit into key grooves between the outer peripheries of the nuts 62 and 63 and the inner periphery of the nut container 67. However, the present invention is not limited only to this structure. It is also possible to prevent rotation of the pair of nuts by forming the pair of nuts of the female screw member as well as the nut container of the movable side casing respectively into different shapes, for example, polygons such as quadrangles.

Moreover, the embodiment has described the example of the structure for preventing the backlash of the tilting mechanism 7 configured to perform positioning of the jacket unit 3 in the tilting direction. However, the present invention is not limited only to this configuration and it is also possible to employ a configuration to prevent a backlash of the telescopic mechanism for performing positioning of the jacket unit in the telescopic direction.

It is to be noted that entire contents of Japanese Patent Application No. 2010-167900 (filed on Jul. 27, 2010) are incorporated in this specification by reference.

The present invention is not limited only to the above-described embodiment but can also be embodied by various other aspects by making appropriate modifications.

What is claimed is:

1. A steering column device, comprising:
   a male screw shaft member rotatably supported by any one of a fixed side bracket and a movable side bracket and provided with a male screw portion extending in an axial direction of the male screw shaft member; and
   a female screw member provided on the other one of the fixed side bracket and the movable side bracket, wherein the movable side bracket is movable relative to the fixed side bracket in such a manner that the female screw member is moved relative to the male screw shaft member by rotating the male screw shaft member,
   wherein the female screw member comprises:
      a casing having a nut container formed of a through hole;
      a pair of nuts inserted into the nut container so as to be movable in an axial direction of the nut container and not to be rotatable in a circumferential direction of the nut container, the nuts each having a female screw portion through which the male screw shaft member passes while threadedly engaging with the female screw portion; and
      a wedge member having a tip end in a tapered shape and being disposed so as to be held by the casing at an inner side surface of the nut container so that the tip end of the wedge member is located between the pair of nuts,
   thereby the pair of nuts are separated from each other in the axial direction of the male screw shaft when the tip end of the wedge member is inserted between the pair of nuts, and outside surfaces of the female screw portions of the respective nuts come into contact with the male screw portion of the male screw shaft member and the outside surfaces of the female screw portions of the respective nuts get held by the male screw portion of the male screw shaft member, and
   wherein the pair of nuts are held in the nut container by the casing by means of the wedge member in a state where the pair of nuts are regulated from moving in the axial direction of the nut container.

2. The steering column device according to claim 1, further comprising:
   an insertion hole formed of a screw hole passing through a side surface of the casing while extending orthogonally to the nut container; and
   a screw member inserted into the insertion hole,
   wherein the tip end of the wedge member is formed into such a wedge shape that two opposed surfaces of the tip end come closer to each other toward the tip,
   wherein the pair of nuts respectively include inclined surfaces in a portion where their facing surfaces face the insertion hole, the inclined surfaces forming a wedge-shaped recessed portion configured to receive the tip end of the wedge member,
   wherein the wedge member is disposed between the wedge-shaped recessed portion and the screw member in the screw hole, and
   wherein the wedge member is positioned by screwing the screw member into the insertion hole.

* * * * *